July 17, 1962  B. T. GROBOWSKI  3,044,240
REEL TYPE LAWN MOWER WITH HEIGHT OF CUT ADJUSTMENT
Filed Oct. 26, 1960  3 Sheets-Sheet 1
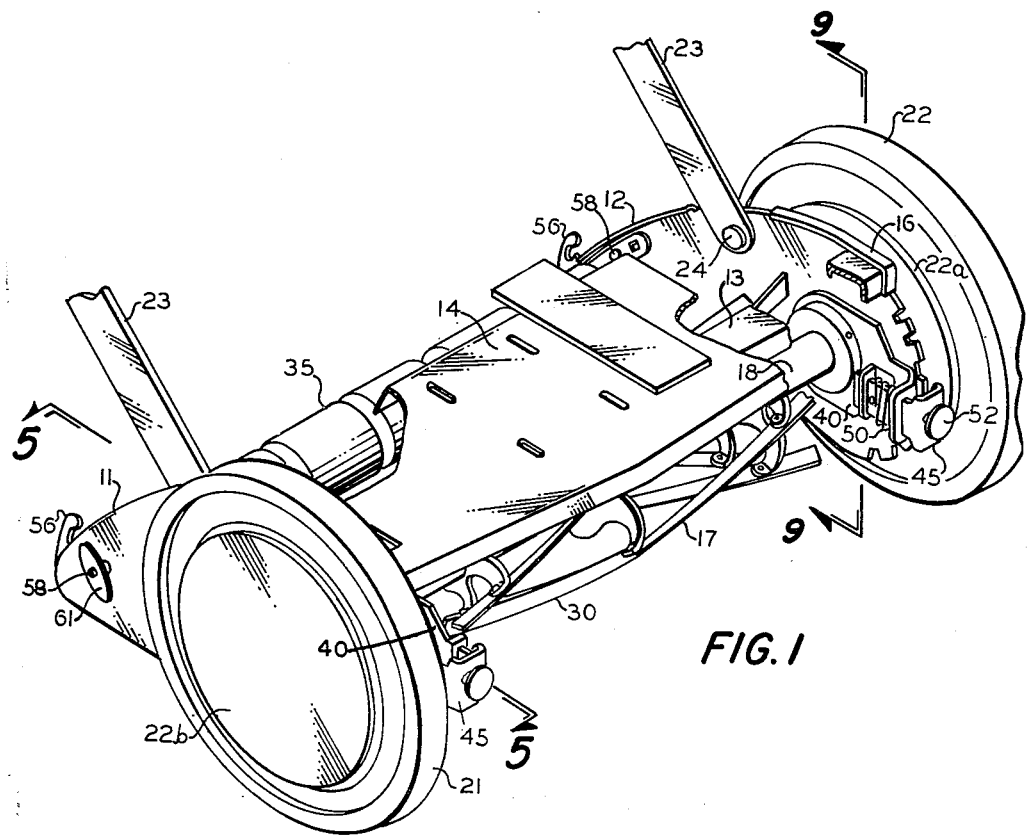
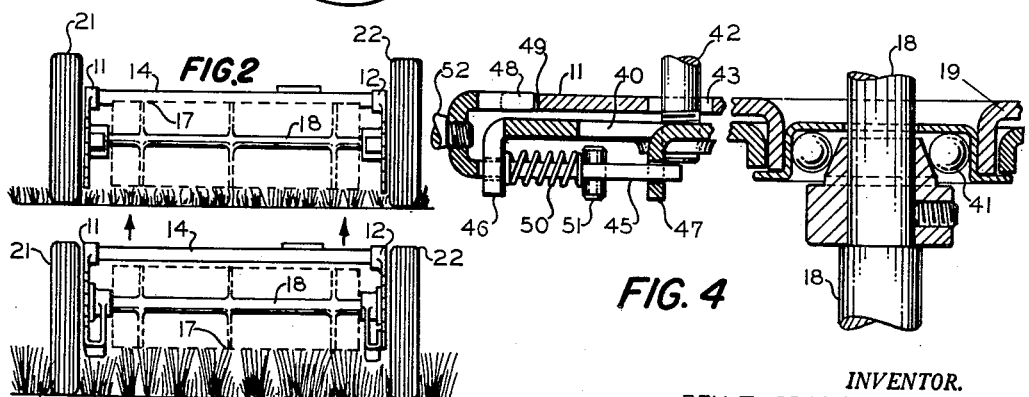
INVENTOR.
BEN T. GROBOWSKI
BY
MAHONEY, MILLER & RAMBO ATTY'S.
BY Wm. V. Miller INVENTOR.
BEN T. GROBOWSKI
BY
MAHONEY, MILLER & RAMBO ATTY'S
BY Wm. V. Miller July 17, 1962  B. T. GROBOWSKI  3,044,240
REEL TYPE LAWN MOWER WITH HEIGHT OF CUT ADJUSTMENT
Filed Oct. 26, 1960  3 Sheets-Sheet 3
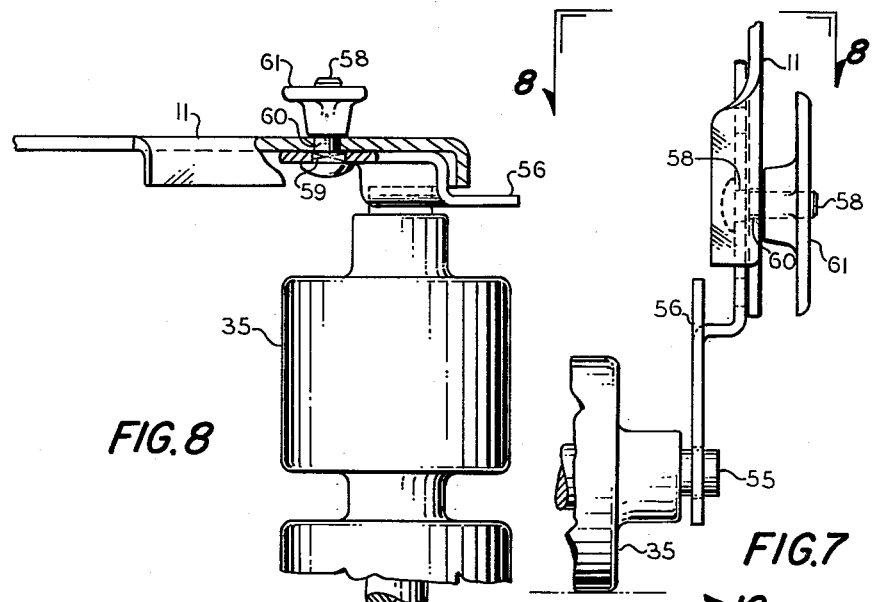
FIG. 8
FIG. 7
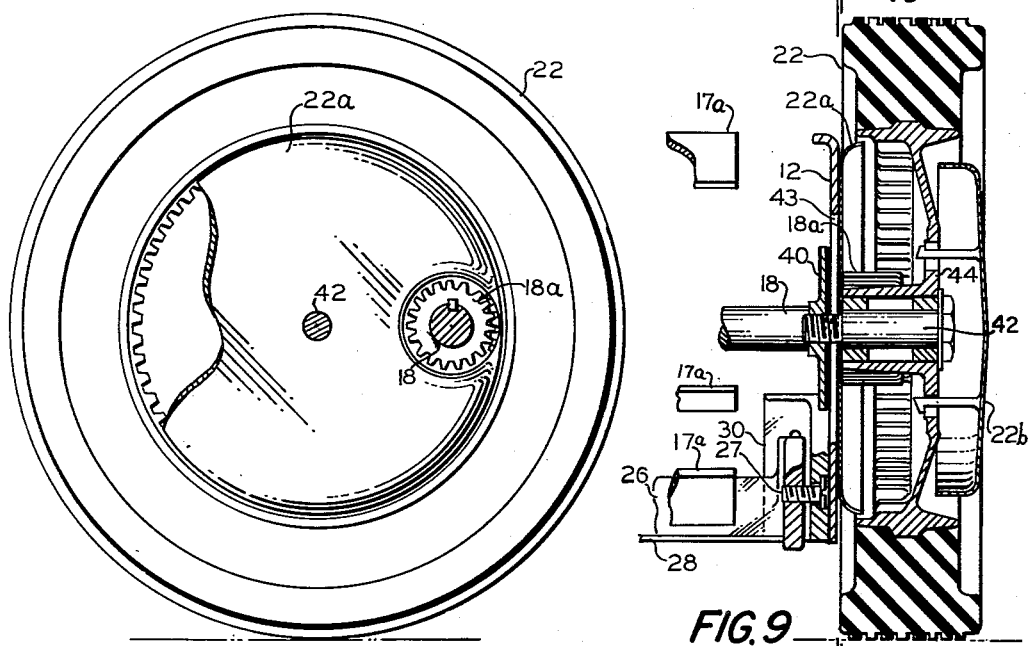
FIG. 10
FIG. 9
INVENTOR.
BEN T. GROBOWSKI
BY
MAHONEY, MILLER & RAMBO ATTY'S.
BY *Wm. V. Miller*

United States Patent Office 3,044,240
Patented July 17, 1962

1

3,044,240
REEL TYPE LAWN MOWER WITH HEIGHT OF CUT ADJUSTMENT
Ben T. Grobowski, Newark, Ohio, assignor to The E. T. Rugg Company, Newark, Ohio, a corporation of Ohio
Filed Oct. 26, 1960, Ser. No. 65,045
2 Claims. (Cl. 56—254)

My invention relates to a reel type lawn mower with height of cut adjustment. It has to do, more particularly, with a lawn mower of the reel type in which an adjustment is provided for selectively varying the height of the cutter reel and associated cutter-bar to vary the height of grass cut by the mower.

There have been many arrangements provided in both reel type lawn mowers and rotary type lawn mowers for varying the height of cut. The adjusting means usually provided for this purpose is complicated and difficult to use. The present invention deals only with lawn mowers of the reel type and provides a simple structure which is easy to use in order to obtain an accurate adjustment of the height of cut. More specifically, it relates to a means for independently mounting each of the two supporting wheels of the mower for vertical adjustment relative to the reel and associated cutting bar to thereby locate the cutting bar at different levels. This wheel adjustment, along with adjustment of the roller which is provided for, makes it possible to easily vary the height of cut of the mower. It also includes simple latch means associated with each wheel adjusting means which can be released easily and which will automatically latch the wheel in any of a plurality of selected adjusted positions.

The preferred embodiment of my invention is illustrated in the accompanying drawings wherein:

FIGURE 1 is a perspective view showing my invention embodied in a lawn mower.

FIGURE 2 is a diagrammatic view illustrating the adjustment of the mower into a low cut position.

FIGURE 3 is a view similar to FIGURE 2 showing the adjustment of the mower into a higher cut position.

FIGURE 4 is a fragmentary horizontal sectional view taken along line 4—4 of FIGURE 5.

FIGURE 7 is an enlarged sectional view taken along line 7—7 of FIGURE 6, illustrating the roller positioning means.

FIGURE 8 is a top view taken along line 8—8 of FIGURE 7.

FIGURE 9 is an enlarged vertical sectional view taken along line 9—9 of FIGURE 1 through one of the wheels at the axle thereof.

FIGURE 10 is a vertical sectional view, partly broken away, taken on line 10—10 of FIGURE 9.

Figure 5:
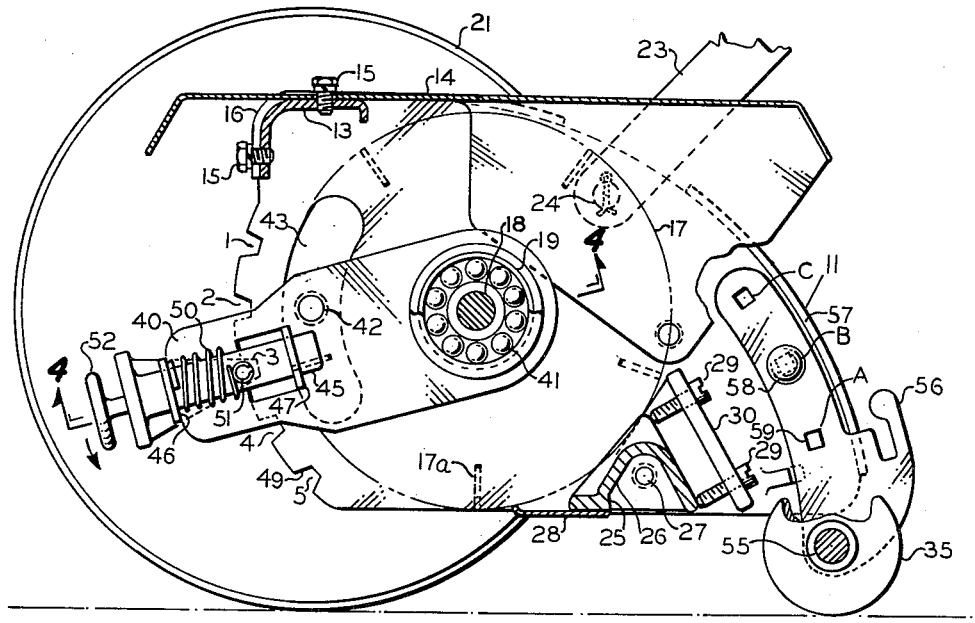
FIGURE 5 is a vertical sectional view taken along line 5—5 of FIGURE 1, showing the mower adjusted for a high cut.

With reference to the drawings, in FIGURE 1 I have illustrated the main parts of a mower to which my invention may be applied. However, it is to be understood that my invention is not limited to a mower of this specific structure. The mower illustrated is designed to receive an engine and driving means (not shown) in that it is designed as a power mower. However, my invention is equally applicable to a hand type mower. Whether the mower is power-operated or hand-operated, it is of the reel type, as illustrated.

The mower is shown as embodying the side plates 11 and 12 disposed at opposite sides and which are joined together rigidly in parallel spaced relationship. The plates are upright and elongated, extending forwardly and rearwardly of the mower. They are rigidly secured together by suitable means including a cross brace 13 which is suitably rigidly attached thereto. The brace 13 may carry a transversely extending horizontally disposed support or shelf 14 which may be suitably attached to the brace and side plates. The brace may be attached to each side plate by means of bolts 15 passed through a flange 16 on the associated plate and the contacting end of the brace. The shelf 14 may support the driving means and other parts of the mower (not shown) if it is a power mower. The cutter reel 17 of the mower is of the usual type and is mounted between the side plates 11 and 12, the axis thereof being normal to the side plates. This reel 17 includes a driven shaft 18 which is rotatable in bearings 19 carried in fixed locations by the side plates 11 and 12 and including the balls 41. Thus, the reel 17 will rotate about an axis fixed relative to the side plates 11 and 12 and normal thereto. Wheels 21 and 22 of the internal gear type are disposed directly outside the respective side plates 11 and 12 and are mounted on the mower in a special manner for independent vertical adjustment, as will be described more in detail hereinafter. A suitable handle structure 23 may be pivoted to the respective side plates 11 and 12 by means of the pivot pins 24.

Figure 6:
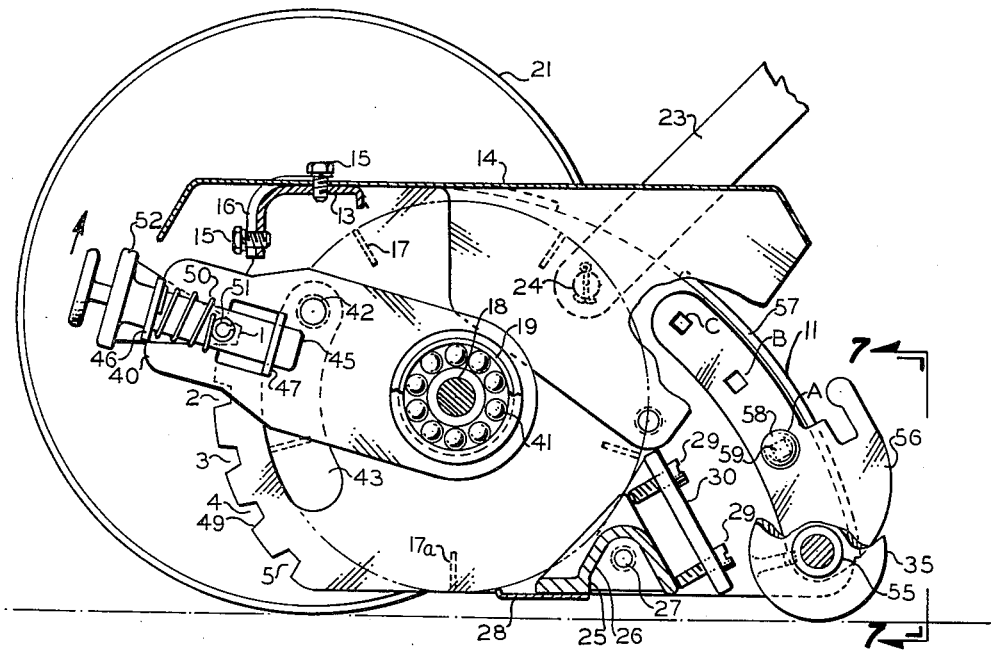
FIGURE 6 is a view similar to FIGURE 5 but showing the mower adjusted for a low cut.

Associated with the cutter reel 17 is a cutter bar assembly 25 (FIGURES 5 and 6). This assembly extends transversely between the side plates 11 and 12 at the lower edges thereof and adjacent the rear ends thereof. The assembly is carried by a rigid bar 26, the ends of which are pivotally attached to the respective side plates by means of the aligned pivot pins 27. This bar 26 not only serves to support the cutter blade 28 for cooperation with the cutter reel 17 but also serves as an additional support or connection for rigidly attaching the plates 11 and 12 together. Thus, the cutter bar assembly 25 is pivotally carried by the side plates 11 and 12 and extends transversely in normal relationship to the side plates and parallel to the axis of the cutter reel 17 so that the blade 28 will properly cooperate with the blades 17a of the cutter reel. The bar 26 can be adjusted about the pivot axis passing through the pivot pins 27 by means of bolts 29 threaded through lugs 30 on the respective side plates 11 and 12.

The mower also includes a roller assembly 35 (FIGURES 5 to 8) which is positioned behind the cutter reel 17 and which has its axis adjacent the rear and lower extremities of the side plates 11 and 12. The roller assembly 35 is attached to the plates 11 and 12 for vertical adjustment relative thereto in a manner to be described hereinafter.

As previously indicated, the wheels 21 and 22 are vertically adjustable relative to the associated side plates 11 and 12. Each wheel is adjusted and located independently of the other by independent means. Therefore, one of these means only will be described since they are identical.

Each of these adjusting and locating means comprises a wheel axle supporting arm 40 (FIGURES 1, 4, 5, and 6). This arm 40 is mounted for vertical swinging movement about the axis of the reel shaft 18. The arm 40 is mainly of flat form and is disposed directly inwardly of the associated side plate 11 or 12. The plate 11 is illustrated in FIGURES 4 to 6. The arm 40 extends forwardly from its pivot axis and carries the wheel axle 42 of the wheel 21 in a rigid fixed position adjacent its upper edge and spaced from the arm pivot axis which is the axis of the shaft 18. Each axle 42 extends outwardly through an arcuate slot 43 formed in the cooperating plate 11 or 12 and is disposed in the hub of the wheel 21 or 22, the wheel 21 being shown in FIGURES 5 and 6 and the axle 42 being indicated in FIGURE 9, the wheel 22 is shown. Thus, each arm 40 rotatably carries the associated wheel.

Thus, vertical swinging movement of the arm 40 about the axis of the cutter reel shaft 18 will swing the wheel axle 42 vertically along the arcuate slot 43 in the side plate 11 or 12 and will consequently raise or lower the wheel relative to the plate. Thus, each wheel rotates about an axis which is displaced radially from the axis of the cutter reel and which is vertically adjustable through an arc having its center at the axis of the cutter reel. Each wheel is driven by a pinion 18a (FIGURE 10) which engages the internal gear thereof and which is keyed on the associated end of the shaft 18 which projects into the wheel, the pinion for driving the wheel 22 being shown in FIGURE 10. When the arm 40 is swung about the axis of the shaft 18, the corresponding pinion 18a rotates about the same axis. A guard plate 22a is provided inside the wheel on the axle 42 and a hub cap 22b is provided on the outside of the wheel.

Releasable retaining or latching means is provided for holding the arm 40 in selectively adjusted vertical position. This means comprises a plunger type latching bar 45. This bar is slidably carried in inwardly extending, radially spaced lugs 46 and 47 provided on the arm 40, as shown in FIGURE 4. It will be noted that the arm 40 extends beyond the forward edge of the associated plate 11 or 12, as shown in FIGURES 1, 4, 5 and 6, where plate 11 is shown, and that the latch bar 45 extends forwardly or outwardly beyond the arm and is turned laterally outwardly and then inwardly toward the forward edge of the plate 11 to provide a latching or retaining end 48. This inturned end is adapted to engage with positioning or retaining notches 49 formed in the forward edge of the plate 11. It will be noted that the forward edge of the plate 11 follows an arc which has its center at the axis of the reel shaft 18 and which, therefore, is concentric with the arc of curvature of the slot 43 being spaced slightly forwardly thereof. A compression spring 50 (FIGURES 1, 4, 5 and 6) is provided on the bar 45 between a fixed stop 51 carried thereby and the outermost lug 46 on the arm 40. A knob or handle 52 is attached to the lateral outer portion of the bar 45 and is used for overcoming the resistance of the spring 50 which normally holds the retaining end 48 in one of the notches 49. Thus, it will be apparent that the arm 40 may be released readily from its selected position and be moved to any other selected position. Preferably, the retaining notches 49 in the plate 11 or 12 are numbered consecutively 1 to 5 from top to bottom, as indicated, and any suitable number of notches, and therefore reel positions, may be provided.

When the wheels 21 and 22 are adjusted, they are adjusted independently which makes the adjustment easy to accomplish since only the weight of one wheel and its associated adjusting arm need be handled. However, both wheels are adjusted uniformly as shown in FIGURES 2 and 3. This adjustment may be utilized to provide a relatively low position of the cutter reel 17, as shown in FIGURE 2, or a relatively high position, as shown in FIGURE 3. In FIGURE 6, a low position is shown whereas in FIGURE 5 a high position is shown and it will be apparent from these figures, where the cutter reel is indicated in phantom, that the cutter bar 28 moves with the cutter reel 17 and keeps its same relationship thereto. It is important to keep the blade 28 substantially in a non-tilted or horizontal plane forwardly and rearwardly of the mower when the height of cut is adjusted. Therefore, as previously indicated, adjustable means is provided for attaching the roller assembly 35 to the side plates 11 and 12 so that the roller axis can be adjusted vertically relative to the side plates in accordance with vertical adjustment of the wheels 21 and 22. As indicated in FIGURES 5, 6, 7 and 8, this means is identical at each end of the roller assembly and, therefore, only one mounting means, that adjacent the plate 11, will be described.

The roller assembly may be of any suitable structure but is illustrated as comprising several small rollers carried on a shaft 55. This shaft 55 is carried by an arcuate bracket 56 at the lower end thereof. This bracket 56 is mounted on the associated side plate 11 adjacent an arcuate flange 57 at the rear edge of the plate. A clamping bolt 58 is passed through the bracket 56 and is provided with a square shank which is adapted to extend through any of a number of square openings 59 provided in the bracket. The openings 59 are located at different levels along the bracket and may be provided in any suitable number, three being shown and designated A, B and C in consecutive order from the uppermost to the lowermost. Each opening is adapted to be selectively aligned with a square opening 60 in the plate 11 in which the bolt 58 is positioned. The clamping bolt 58 includes a knob or clamp nut 61 threaded on its outer end and it will be apparent that the bolt can be readily positioned in any selected opening 59. This, consequently, will position the roller shaft 55 at any of the three levels.

In practice, in the arrangement shown in the drawings, it is preferred that when the wheels 21 and 22 are adjusted by movement of the arms 40 to positions determined by the retaining notches 49 at the positions 1 and 2, the bolts 58 of the roller brackets are in the lowermost bracket holes 59, indicated at A. In arm positions 2, 3 and 4, the bolts 58 are preferably in the middle bracket holes B. In arm positions 4 and 5, the bolts are in the top holes indicated by C. Thus, although the wheels 21 and 22 are moved vertically, the plates 11 and 12 are not tilted substantially since the roller assembly 35 is correspondingly adjusted vertically. This will prevent undesirable tilting of the cutter blade 28.

It will be apparent that I have provided a simple arrangement whereby the wheels of a mower can be independently adjusted relative to the cooperating cutter reel and cutter blade in order to vary the height of cut. This adjustment, along with the adjustment of the roller, can be made with ease and without any tools. The wheels and the roller will be effectively retained in their selected positions after the adjustment.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A lawn mower comprising a pair of upright side plates rigidly secured in vertical planes which are in laterally spaced relationship, a cutter reel having a shaft mounted in said side plates for rotation about an axis transversely thereof at right angles thereto, a cutter blade carried by the side plates and extending transversely thereof at right angles thereto in parallel radially spaced relationship to the transverse axis of the reel for cooperation with said cutter reel, a pair of axles, a pair of upright wheels disposed laterally outwardly of the respective side plates in planes in substantially parallel relationship thereto for vertical movement relative thereto, means for mounting each wheel for independent vertical adjustment in its plane relative to its respective side plate, each of said wheels being carried by an axle for rotation about its axis, said axle extending inwardly from said wheel through an arcuate slot in the said respective side plate which has its center of curvature at the axis of the reel, a radially extending adjusting arm supporting said axle, said arm being disposed laterally inwardly of said respective side plate in a vertical plane parallel to the side plate and having an inner end supported on said reel shaft for vertical swinging movement about the axis thereof in said plane parallel to the plane of the respective wheel, said wheel axle being supported on said arm at a point spaced radially from the axis of the reel shaft to permit swinging of the axle in said arcuate slot, said wheel having an internal ring gear and the adjacent end of said reel shaft carrying a pinion meshing with said gear, means for retaining said arm in selectively adjusted positions about the axis of the reel shaft, said means comprising a spring-pressed plunger carried by said arm and having a latching plunger directed radially inwardly of the arm, said respective side plate having an arcuate edge adjacent said arm and spaced radially outwardly relative to said arcuate slot with notches spaced along said arcuate edge for receiving the said latching plunger, said arcuate edge having its center of curvature at the axis of said reel shaft so that it is parallel to said slot.

2. A lawn mower according to claim 1 including a roller assembly adjacent said cutter blade having a roller which extends transversely between said side plates for rotation about a transverse axis relative thereto, a pair of brackets supporting the ends of said roller and extending vertically along the respective side plates, and clamping means for clamping each of said brackets in selected vertical positions along its respective side plate in accordance with the vertical adjustment of the associated wheel.

References Cited in the file of this patent

UNITED STATES PATENTS

| | | |
|---|---|---|
| 2,513,309 | Grobowski et al. | July 4, 1950 |
| 2,915,318 | Chesser | Dec. 1, 1959 |